Nov. 10, 1931. G. K. FOSTER 1,830,789
ANTIFROST DEVICE
Filed Dec. 23, 1929
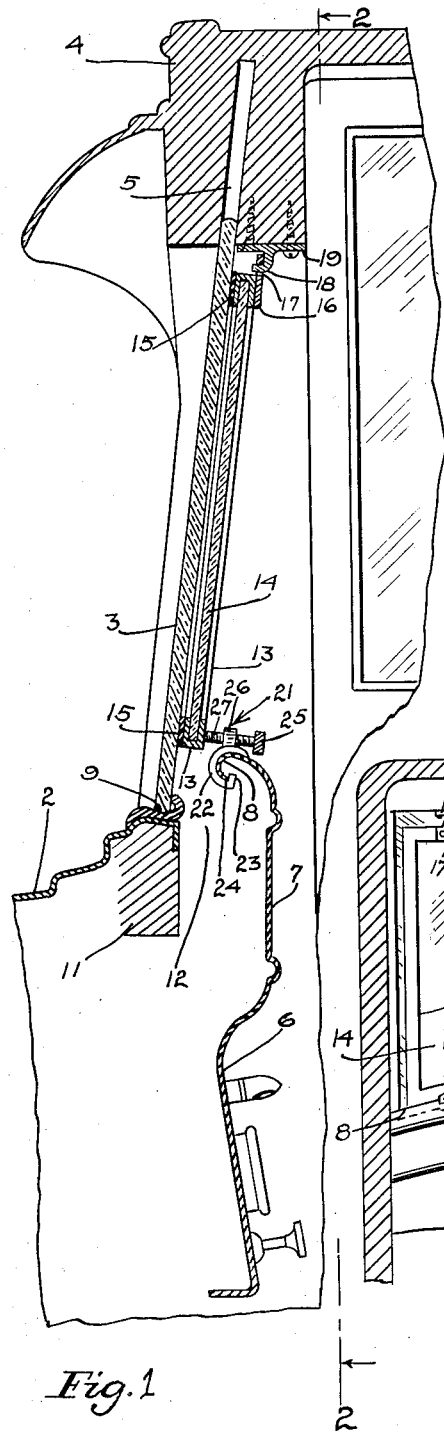
Fig.1
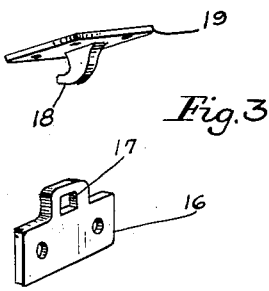
Fig.3
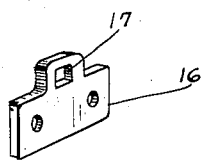
Fig.4
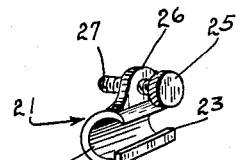
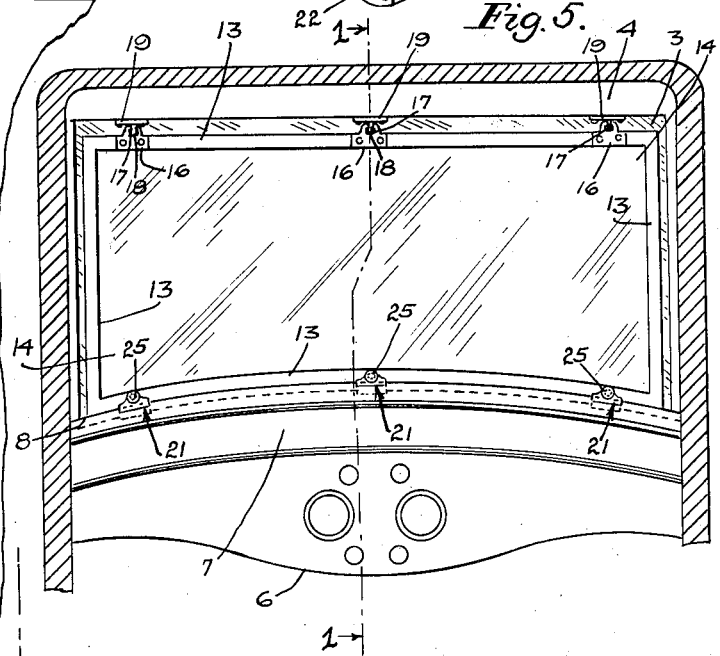
Fig.2 Fig.5.
Inventor
GEORGE K. FOSTER
By
Attorneys Patented Nov. 10, 1931

1,830,789

UNITED STATES PATENT OFFICE

GEORGE K. FOSTER, OF MINNEAPOLIS, MINNESOTA

ANTIFROST DEVICE

Application filed December 23, 1929. Serial No. 416,028.

This invention relates to means for supporting an anti-frost device upon the surface of a windshield or other transparent panel.

Since the advent of the automobile heater, it has become necessary to provide means for preventing the windshield and windows of an automobile from frosting when the car is driven in cold weather and the heater is functioning. To prevent such frosting of the windshield and other windows of the automobile, transparent panels, usually of celluloid or glass, are secured to the surface of the windshield in such a manner as to provide a dead air space between the glass of the windshield and the anti-frost device. To maintain this dead air space the engagement of the marginal portions of the anti-frost device with the glass of the windshield must be sealed so as to prevent air circulation between the windshield and the device. Suction means are often utilized for this purpose. These, however, have not proven satisfactory as they often jar loose and sometimes become completely detached from the surface of the windshield.

It is the purpose of this invention to provide means adaptable for use in connection with an ordinary automobile to firmly support an anti-frost device upon the surface of the windshield in such a manner that it cannot accidentally become detached therefrom or shift its position thereon. The attaching means are also capable of firmly holding the anti-frost device against the surface of the windshield glass so as to prevent the circulation of air through the space provided between the glazed wall of the anti-frost device and the surface of the windshield.

The particular object of the invention therefore, is to provide an improved anti-frost device and means for supporting the same upon the windshield.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is an enlarged detail sectional view on the line 1—1 of Figure 2, showing the means provided for supporting the anti-frost device upon the surface of the windshield;

Figure 2 is a cross sectional view on the line 2—2 of Figure 1;

Figure 3 is a perspective view showing one of the hook elements for supporting the upper portion of the anti-frost device;

Figure 4 is a perspective view showing one of the members adapted to be attached to the upper marginal edge of the anti-frost device and cooperating with the hook elements to support the upper portion of the device; and Figure 5 is a perspective view showing a clamping member for holding the lower marginal edge of the anti-frost device in contact with the glass of the windshield.

In the selected embodiment of the invention here shown, for purposes of disclosure, there is illustrated in Figures 1 and 2, a portion of an automobile including the usual cowl 2, windshield 3, and an upper sill 4, here shown provided with a transverse slot 5 adapted to receive the upper marginal edge of the windshield 3. The usual instrument board 6 is also shown, and extends upwardly as indicated at 7 and is provided at its upper portion with a rolled edge 8, spaced from the adjacent surface of the windshield glass 3 and arranged on an elevation above a seat 9 which may support the lower edge of the windshield, as shown. The seat 9 is shown supported upon the usual cross member 11, and the rolled edge 8 and the portion 7 of the instrument board is spaced from the sill 11 to provide an air circulation passage 12 through which air may be directed downwardly into the forward portion of the automobile, when the windshield is elevated so that its lower edge will be spaced above the seat 9. The structure above described, is more or less standard in many makes of automobiles.

The anti-frost device here shown comprises a frame 13, preferably configured as shown in Figure 2 so as to substantially cover the inner surface of the windshield glass. The rails comprising the frame 13 of the device are preferably of U-shaped cross section, as shown in Figure 1, so as to receive the transparent panel 14 of the anti-frost device. This panel may be of glass or celluloid, or any other suitable transparent material.

A suitable flexible gasket 15 is interposed between the frame 13 of the device and the surface of the windshield glass, as shown in Figure 1, so that when the frame 13 is firmly held against the surface of the windshield glass, the joint between the frame and the surface of the windshield glass will be sealed against the circulation of air between the two transparent panels.

As hereinbefore stated, a feature of the invention resides in the means provided for holding the anti-frost device against the surface of the windshield glass. The upper portion of the frame 13 has a plurality of plates 16 secured thereto, each provided with a loop or aperture 17 adapted to receive a hook element 18, secured to a plate 19 adapted to be secured to the bottom face of the sill 4, as shown in Figure 1. The hook elements 18 are so positioned upon the sill 4 that when the loops 17 are engaged with the hook elements and the lower portion of the frame 13 is moved in a direction towards the windshield, the gasket 15, which preferably is of a soft spongy rubber, is forced against the surface of the windshield glass in a manner to tightly seal the joint between the upper portion of the frame and the windshield.

The lower portion of the frame 13 is supported by means of a plurality of clamping members 21, shown in Figure 5. Each clamping member 21 is here shown provided with a semi-cylindrical portion 22 adapted to receive the rolled edge 8 of the upper portion of the instrument board 6. An upstanding marginal flange 23 is provided upon each portion 22 adapted to engage the edge 24 of the rolled portion 8 of the instrument board, as shown in Figure 1. A clamping screw 25 is received in threaded engagement with a lug 26 provided upon each member 21. The terminals 27 of the clamping screws 25 are adapted to engage the lower rail of the frame 13, as shown in Figures 1 and 2, whereby when the screws 25 are rotated, they will exert a pressure against the frame 13 to cause the lower portion thereof to be firmly forced against the rubber gasket 15, interposed between the frame 13 and the glass of the windshield.

From the foregoing, it will be readily seen and understood that the anti-frost device including the transparent panel 14 is demountably supported upon the surface of the windshield glass in a manner to substantially exclude the entrance of air between the two transparent panels, thereby substantially preventing the formation of frost upon the inner surface of the windshield glass and thus maintaining a clear vision for the driver. When desirable, the anti-frost device may be quickly removed from the windshield by simply backing up the screws 25 and removing the clamping members 21 from the rolled edge 8 of the instrument board, whereupon the lower portion of the frame 13 may be swung outwardly to permit the loops 17 and the plates 16 to be disengaged from the hook elements 18.

An anti-frost device supported upon a windshield in the manner here set forth, will be firmly held against the surface of the windshield glass so that it cannot possibly jar loose nor relatively shift its position thereon. The particular arrangement of the hook elements 18 and plates 16 at the upper portion of the anti-frost device, and the clamping elements 21 provided at the lower portion thereof, cooperate to demountably support the anti-frost device upon the glass of the windshield in such a manner that it will always be held in air-tight contact therewith, regardless of vibration or jarring of the windshield. The fastening means, including the hook elements 18 and loops 17, and the clamping members 21, may also be used in connection with other types and forms of anti-frost devices, the only requirement being that the anti-frost device be configurated substantially as shown in Figure 2. If the lower rail of the frame 13 of the anti-frost device should be made straight or parallel to the upper rail thereof, the clamping members provided at each end of the anti-frost device may be slightly varied in shape so as to cause the screws 25 to engage the lower rail of the frame 13 in the manner herein described.

The anti-frost device herein disclosed, will readily lend itself for use on many makes of automobiles, and may be readily and quickly attached to or detached from the windshield thereof, in a comparatively short time. Its construction is also very simple and inexpensive, whereby it may be manufactured at a very low cost.

I claim as my invention:

1. The combination with a windshield having an upper supporting member, of an anti-frost device adapted to be supported upon the surface of said windshield, hook elements secured to said upper supporting member and engageable with means on said anti-frost device to support the upper portion thereof, and clamping members mounted upon a fixed support situated at the lower portion of said device and cooperating to firmly hold the lower portion of said device against the surface of the windshield.

2. The combination with a windshield having an upper supporting member, of an antifrost device including a glazed frame adapted to be supported against the surface of the windshield, hook elements for detachably supporting the upper portion of said frame in position upon the windshield, a fixed support at the lower portion of said windshield, and a plurality of clamping members detachably mounted upon said fixed support and each having a screw adapted to engage the lower rail of said frame whereby pressure may be brought to bear against said frame and the latter forced into air-tight engagement with the surface of the windshield glass, thereby providing a dead air space between the windshield and the glazed panel supported in said frame.

3. In combination with a windshield having an upper support and a lower support, of an anti-frost device comprising a glazed panel provided with a frame adapted to be supported against the glass of the windshield, means for pivotally and detachably securing the upper portion of said frame to said upper support, a fixed member at the lower portion of the windshield spaced from said lower support, and a clamping member slidably and detachably mounted upon said fixed member and adapted to engage and force the lower portion of said frame into engagement with the surface of the windshield in substantially air-tight relation.

4. In combination with a windshield having an upper support and a lower support, of an anti-frost device comprising a glazed panel provided with a frame adapted to be supported against the glass of the windshield, means for pivotally and detachably securing the upper portion of said frame to said upper support, a fixed member at the lower portion of the windshield spaced from said lower support, a member slidably and detachably mounted upon said fixed member, and a clamping screw carried by said slidable member and adapted to engage and force the lower portion of said frame into engagement with the surface of the windshield in substantially air-tight relation.

5. In combination with a windshield having an upper support and a lower support, of an anti-frost device comprising a glazed panel provided with a frame adapted to be supported against the glass of the windshield, hook elements for pivotally and detachably securing the upper portion of said frame to said upper support, a fixed member at the lower portion of the windshield spaced from said lower support and having an upper rolled edge, a member provided with a semi-cylindrical portion adapted to be slidably and detachably mounted upon said rolled edge, and a clamping screw carried by said cylindrical portion and adapted to engage and force the lower portion of said frame into engagement with the surface of the windshield in substantially air-tight relation.

6. The combination with a window having an upper supporting member, of a device adapted to be supported over the surface of said window, hook elements engageable with said upper supporting member and with said device to provide a support for the upper portion of the device, and clamping members mounted upon a fixed support situated at the lower portion of said device and cooperating to firmly hold the lower portion of said device in position.

In witness whereof, I have hereunto set my hand this 20th day of December, 1929.

GEORGE K. FOSTER.